United States Patent [11] 3,609,189

[72] Inventors Clarence R. Bresson;
 Raymond L. Cobb, both of c/o Phillips
 Petroleum Company, Bartlesville, Okla.
[21] Appl. No. 749,990
[22] Filed Aug. 5, 1968
 Division of Ser. No. 492,892, Oct. 4, 1965,
 Pat. No. 3,414,617
[45] Patented Sept. 28, 1971

[54] NOVEL MULTIFUNCTIONAL HYDROXY COMPOUNDS AND METHODS FOR THE PREPARATION THEREOF
 4 Claims, No Drawings
[52] U.S. Cl. .................................................. 260/561,
 106/287, 106/1, 252/61 R, 252/189, 260/514 R,
 260/557 R, 260/559 A, 260/559 T, 260/570.5 CA,
 260/570.5 R, 260/570.5 S, 260/570.8 R, 260/584
 R, 260/648 R, 260/775, 424/320
[51] Int. Cl. ................................................... C07c 103/00

[50] Field of Search .......................................... 260/561

[56] References Cited
 UNITED STATES PATENTS
 2,874,190  2/1959  Goldberg ...................... 260/561
 3,318,953  5/1967  Wehrmeister ...... ......... 260/558
 2,976,216  3/1961  Mytt ............................ 167/87.1
 3,414,617  12/1968 Bresson et al ................. 260/570.5

*Primary Examiner*—James O. Thomas, Jr.
*Assistant Examiner*—Ethel G. Love
*Attorney*—Young and Quigg

ABSTRACT: N-alkylated derivatives of 2-amino-2-hydrocarbylthiomethyl-1-1,3-propanediols, useful as flotation agents, rubber modifiers, and chelating agents in the separation of metals, are produced by reacting 2-amino-2-hydrocarbylthiomethyl-1,3-propanediols with organic halides. Thiols can be produced by reacting arylmethylated or alkarylmethylated derivatives of the above compounds with an alkali metal in the presence of ammonia.

NOVEL MULTIFUNCTIONAL HYDROXY COMPOUNDS AND METHODS FOR THE PREPARATION THEREOF

This is a divisional application of Application Ser. No. 492,892, filed Oct. 4, 1965, now issued as U.S. Pat. No. 3,414,617 granted Dec. 3, 1968.

In one aspect this invention relates to novel hydrocarbylthiomethyl and mercaptomethyl-substituted propandediols. In another aspect this invention relates to N-alkylated derivatives of 2-amino-2-hydrocarbylthiomethyl-1-1,, 3-propanediols. In still another aspect this invention relates to a method for preparing such novel compounds.

In accordance with this invention, an N-alkylated derivative of a 2-amino-2-hydrocarbylthiomethyl-1-1,3-propanediol having the formula (I) 

is produced by the reaction of a 2-amino-2-hydrocarbylthiomethyl-1-1,3-propanediol having the formula (II) 

with an organic halide having the formula R"X whereby R" replaces one of the hydrogens on the amino group with the liberation of HX.

With reference to the above formulas R is at least one member selected from the group consisting of hydrogen and alkyl containing one to three carbon atoms; R' is a monovalent hydrocarbyl radical selected from the group consisting of alkyl, cycloalkyl, aryl, and combinations thereof such as alkaryl, aralkyl, and the like, said monovalent hydrocarbyl radical containing one to 12 carbon atoms; R" is a member selected from the group consisting of unsubstituted and substituted alkyl, cycloalkyl, and aralkyl radicals, and combinations thereof such as alkylcycloalkyl, alkylaralkyl, and the like, containing one to 12 carbon atoms, the substituent in the substituted radicals being a monovalent radical such as hydroxy, hydrocarbyloxy, hydrocarbylthio, carboxy, carbamoyl, and the like; and X is a halogen selected from the group consisting of chlorine, bromine, and iodine, preferably chlorine or bromine; and wherein the number of carbon atoms in formula I is within the range of six to 36.

Examples of novel products made according to the process described hereinabove are as follows:

2-methylamino-2-methylthiomethyl-1,3-propanediol
2-ethylamino-2-[1-(isopropylthio)butyl]-1,3-propanediol
2-isopropylamino-2-[1-(ethylthio)ethyl]-1,3-propanediol
2-tert-butylamino-2-[1-(sec-butylthio)-1-methylpropyl]-1,3-propanediol
2-hexylamino-2-tert-butylthiomethyl-1,3-butanediol
3-(1,2-diethylpentylamino)-3-hyxylthiomethyl-2,4-hexanediol
2-dodecylamino-2-(3-methyloctyl)thiomethyl-1,3-hexanediol
5-dodecylamino-5-[1-(dodecylthio)propyl]-4,6-nonanediol
2-cyclohexylamino-2-decylthiomethyl-1,3-propanediol
2-(2-methylcyclopentylamino)-2-cyclohexylthiomethyl-4-methyl-1,3-pentanediol
2-(2-cyclohexylethylamino)-b 2-phenylthiomethyl-1,3-propanediol
2-(2-phenylethylamino)-2-p-tolylthiomethyl-1,3-propanediol
2-(4-methylbenzylamino)-2-[1-(propylthio)-2-methylpropyl]-1,3-propanediol
5-(3-hydroxypropylamino)-5-[1-(dodecylthio)propyl]-4,6-nonanediol
2-(4-ethoxybutylamino)-2-methylthiomethyl-3-methyl-1,3-butanediol
2-(3-methylthiopropylamino)-2-propylthiomethyl-1,3-propanediol
2-(3-carboxycyclopentylamino)-2-butylthiomethyl-1,3-propanediol
2-(3-carbamoylpropylamino)-2-phenylthiomethyl-1,3-propanediol
2-methylamino-2-benzylthiomethyl-1,3-butanediol Examples of compounds of formula II suitable for reacting with an organic halide are the following:

2-amino-2-methylthiomethyl-1,3-propanediol
2-amino-2-[1-(ethylthio)ethyl]-1,3-propanediol
2-amino-2-[1-(isopropylthio)butyl]-1,3-propanediol
2-amino-2-[1-(sec-butylthio)-1-methylpropyl]-1,3-propanediol
2-amino-2-tert-butylthiomethyl-1,3-butanediol
3-amino-3-hexylthiomethyl-2,4-hexanediol
2-amino-2-(3-methyloctyl)thiomethyl-1,3-hexanediol
2-amino-2-decylthiomethyl-1,3-propanediol
2-amino-2-cyclohexylthiomethyl-4-methyl-1,3-pentanediol
2-amino-2-phenylthiomethyl-1,3-propanediol
2-amino-2-p-tolylthiomethyl-1,3-propanediol
2-amino-2-[1-(propylthio)-2-methylpropyl]-1,3-propanediol
5-amino-5-[1-(dodecylthio)propyl]-4,6-nonanediol
2-amino-2-methylthiomethyl-3-methyl-1,3-butanediol
2-amino-2-benzylthiomethyl-1,3-butanediol Examples of organic halide compounds suitable in the process of this invention are the following:

bromomethane
iodoethane
2-chloropropane
2-bromo-2-methylpropane
1-chlorohexane
3-bromo-4-ethylheptane
1-chlorododecane
chlorocyclohexane
1-bromo-2-methylcyclopentane
1-iodo-2-cyclohexylethane
1-chloro-2-phenylethane
α-bromo-p-xylene
3-bromopropanol
1-chloro-4-ethoxybutane
1-bromo-3-methylthiopropane
1-chloro-3-carboxycyclopentane
3-bromobutyramide In carrying out the process of this invention, the mol ratio of 2-amino-2-hydrocarbylthiomethyl-1,3-propanediol to organic halide is preferably about 1/1; however, it is within the scope of the invention that mol ratios ranging from 0.5/1 to 2/1 can be employed. The amino compound can be employed as the free base which can be obtained from a salt thereof, e.g. as a hydrohalide or sulfate; thus, if the amine is available as the salt, it is preferably first treated with a base to liberate the free amine.

Although the reaction temperature can vary over a wide range, it would generally be within the range of about 0°–250° C., preferably within the range of about 50°–150° C. The desired reaction time also varies over a wide range, depending in part on the reaction temperature and the nature of the reactants, but will generally be within the range of about 10 minutes to about 5 days, preferably within the range of from 5 hours to 3 days.

In the operation of the process of this invention a solvent is not required; however, in the preferred embodiment solvents are employed. Examples of some suitable solvents include alcohols such as methanol, ethanol, n-propyl alcohol, isopropyl alcohol, n-butyl alcohol, n-hexyl alcohol; alcohol; such as ethyl ether, n-propyl ether, n-butyl ether, tetrahydrofuran, dioxane, dimethyl ether of ethylene glycol; and amides such as dimethylformamide, dimethylacetamide, and N-methylpyrrolidone.

The pressure of the reaction is preferably autogenous and need be only sufficient to maintain the reactants and their solvents substantially in a liquid phase.

As a further aspect of this invention, when R' is arylmethyl or alkarylmethyl, the said N-alkylated derivative having the formula (I) 

is cleaved by treatment with an alkali metal selected from the group consisting of lithium, sodium, potassium rubidium, and cesium in the presence of ammonia to give a thiol having the formula (III) 

wherein R and R'' are as defined hereinabove. It is noted that when R'' contains an arylmethyl group or an alkarylmethyl group attached to a sulfide linkage, these hydrocarbyl groups will be cleaved by an alkali metal and replaced with hydrogen.

Examples of compounds of formula III ARE AS FOLLOWS:

2-methylamino-2-mercaptomethyl-1,3-propanediol 2-ethylamino-2-(1-mercaptobutyl)-1,3-propanediol 2-isopropylamino-2-(1-mercaptoethyl)-1,3-propanediol 2-tert-butylamino-2-(1-mercapto-1-methylpropyl)-1,3-propanediol 2-hexylamino-2-mercaptomethyl-1,3-butanediol 3-(1,2-diethylpentylamino)-3-mercaptomethyl-2,4-hexanediol 2-dodecylamino-2-mercaptomethyl-1,3-hexanediol 2-cyclohexylamino-2-mercaptomethyl-1,3-propandediol 2-(2-methylcyclopentylamino)-2-mercaptomethyl-4-methyl-1,3-pentanediol 2-(2-cyclohexylethylamino)-2-mercaptomethyl-1,3-propanediol 2-(2-phenylethylamino)-2-mercaptomethyl-1,3-propanediol 2-(4-methylbenzylamino)-2-(1-mercapto-2-methylpropyl)-1,3-propanediol 5-(3-hydroxypropylamino)-5-(1-mercaptopropyl)-4,6-nonanediol 2-(4-ethoxybutylamino)-2-mercaptomethyl-3-methyl-1,3-butanediol 2-(3-methylthiopropylamino)-2-mercaptomethyl-1,3-propanediol 2-(3-carboxycyclopentylamino)-2-mercaptomethyl-1,3-propanediol 2-(3-carbamoylpropylamino)-2-mercaptomethyl-1,3-propanediol In this cleavage step, the amount of alkali metal actually required will vary depending upon the number of reactive groups such as hydroxy, carboxy, arylmethylthio, and alkarylmethylthio which are present, approximately 1 mol of alkali metal being required for each group such as hydroxy or carboxy containing a hydrogen atom readily replaceable by the alkali metal and approximately 1.8 mols of alkali metal being required for each arylmethylthio or alkarylmethylthio group. This amount of alkali metal is usually sufficient to impart a blue cast to the resulting solution which persists for at least 30 minutes. At least 3 mols, preferably at least 10 mols, of ammonia per mol of alkali metal is employed. The amine containing the arylmethylthio or alkarylmethylthio group can be employed as the free base or as a salt, e.g., hydrohalide or sulfate thereof. Although the reaction temperature in this cleavage step can vary over a wide range, it will generally be within the range of about $-100°$ to $50°$ C., usually being approximately the normal boiling point of liquid ammonia. The desired reaction time varies over a wide range, depending in part on the reaction temperature, but will generally be within the range of about 30 minutes to about 12 hours, usually being within the range of from 1 to 6 hours. Although the ammonia conveniently serves as a solvent, an additional solvent can be used in conjunction with the ammonia if desired.

Examples of suitable additional solvents include ethers such as ethyl ether, n-propyl ether, n-butyl ether, tetrahydrofuran, dioxane, dimethyl ether of ethylene glycol and the like. Less preferably alcohols such as methanol, ethanol, n-propyl alcohol, isopropyl alcohol, n-butyl alcohol, n-hexyl alcohol and the like can be employed.

The novel compounds produced by the process of this invention are useful as flotation agents, and those compounds which are cleaved to form the mercapto substituents are useful as intermediates in the preparation of antiradiation drugs. These compounds are also useful as rubber modifiers and as chelating agents in the separation of metals.

It is to be understood that these compounds can be prepared in a continuous medium in the manner disclosed hereinabove and can be recovered by conventional methods, such as crystallization, distillation, solvent extraction, and the like. These recovery operations are conventional steps and are familiar to those skilled in the art. The technique for the recovery of specific compounds can vary somewhat due to differences in molecular weight, solubility, boiling point, and the like.

The following examples are presented merely for descriptive purposes and the invention is not to be unduly limited thereby.

EXAMPLE I

Preparation of 2-benzylthiomethyl-2-(n-octylamino)-1,3-propanediol Hydrochloride A solution of 131.9 g. (0.5 mol) of 2-amino-2-benzylthiomethyl-1,3-propanediol hydrochloride in 500 ml. of ethanol was neutralized with 20 g. (0.5 mol) of sodium hydroxide, and the sodium chloride was removed by filtration. The filtrate was heated at reflux temperature with 74.3 g. (0.5 mol) of n-octyl chloride for 24 hours. The solution was distilled through a 45-in. Vigreux column until the pot temperature reached $120°$ C., at which point an exothermic reaction occurred and the temperature rose to $155°$ C. After 1 hour, the temperature began to fall, and the reaction mixture was held at $150°$ C. for an additional hour with external heating. Unreacted n-octyl chloride (0.124 mol) was removed by distillation. The residual oil was dissolved in 500 ml. of toluene, and the solution was saturated with hydrogen chloride. The resulting semisolid was triturated with warm chloroform to give a 20 percent yield (38.5 g.) of the dried product, 2-benzylthiomethyl-2-(n-octylamino)-n1,3-propanediol hydrochloride, m.p. 127–128° C. Recrystallization from tetrahydrofuran did not change the melting point. The elemental analysis was as follows:

| Element | Calculated for $C_{19}H_{33}NO_2S \cdot HCl$ | Found |
|---------|---------------------------------------------|-------|
| C | 60.69 | 60.7 |
| H | 9.11 | 9.1 |
| N | 3.73 | 3.6 |

EXAMPLE II

Preparation of 2-Mercaptomethyl-2-(n-octylamino)-1,3-propanediol Hydrochloride

A slurry of 31 g. (0.08 mol) of 2-(n-octylamino)-2-benzylthiomethyl-1,3-propanediol hydrochloride in 100 ml. of tetrahydrofuran was added to a liter of liquid ammonia at approximately −33° C. and atmospheric pressure. Addition of 7 g. (0.30 mol) of sodium resulted in a solution which remained blue for an hour. The solution was neutralized with 16 g. (0.30 mol) of ammonium chloride. After addition of 250 ml. of n-propyl alcohol, the ammonia was boiled off. The mixture was then saturated with hydrogen chloride. After warming, the inorganic salts were removed by filtration. The filtrate was stripped to dryness. The residual oil was extracted with 250 ml. of ether. The viscous residue was dissolved in tetrahydrofuran, and the solution was saturated with hydrogen chloride; no crystallization occurred. Similar attempts to induce crystallization from methanol and n-propyl alcohol as solvents were unsuccessful. The oil was dried at 100° C. to give a 40 percent yield (9.0 g.) of the 2-mercaptomethyl-2-(n-octylamino)-1,3-propanediol hydrochloride. The elemental analysis was as follows:

| Element | Calculated for $C_{12}H_{27}NO_2S \cdot HCl$ | Found |
|---|---|---|
| C | 50.42 | 50.75 |
| H | 9.87 | 9.95 |
| N | 4.90 | 4.7 |
| S | 11.22 | 11.3 |

EXAMPLE III

Preparation of 2-Benzylthiomethyl-2-(2-hydroxyethylamino)-1,3-propanediol Hydrochloride A solution of 131.9 g. (0.5 mol) of 2-amino-2-benzylthiomethyl-1,3-propanediol hydrochloride in 250 ml. of methanol was neutralized with 20 g. (0.5 mol) of sodium hydroxide. The sodium chloride was removed by filtration. The filtrate was heated at reflux temperature for 24 hours with 40 g. (0.5 mol) of 2-chloroethanol. The solvent was removed through use of a 60 cm. column packed with glass helices; at 120° C., an exothermic reaction occurred. The dark residue was crystallized from 250 ml. of tetrahydrofuran to give a 20 percent fluid (31 g.) of 2-benzylthiomethyl-2-(2-hydroxyethylamino-1,3-propanediol hydrochloride, m.p. 107–108.5° C. The elemental analysis is as follows:

| Element | Calculated for $C_{13}H_{21}NO \cdot HCl$ | Found |
|---|---|---|
| C | 50.72 | 50.6 |
| H | 7.1 | 7.3 |
| N | 4.55 | 4.5 |
| S | 10.42 | 10.8 |

EXAMPLE IV

Preparation of 2Mercaptomethyl-2-(2-hydroxyethylamino)-1,3-propanediol Hydrochloride A slurry of 31 g. (0.1 mol) of 2-benzylthiomethyl-2-(2-hydroxyethylamino)-1,3-propanediol hydrochloride in 150 ml. of tetrahydrofuran was added to 1 liter of liquid ammonia at approximately −33° C. and atmospheric pressure. Sodium (8.5 g., 0.37 mol) was added to maintain a blue solution for 1 hour. The solution was neutralized with 20 g. (0.37 mol) of ammonium chloride, and the ammonia was boiled off. A cold suspension of the residue in 150 ml. of n-propyl alcohol was saturated with hydrogen chloride. The mixture was warmed, and inorganic salts were removed by filtration. The filtrate was stripped. The residue was washed with ether to give a crystalline solid. Two recrystallizations from a mixture of isopropyl alcohol and methanol gave a 31 percent yield (6.8 g.) of the 2-mercaptomethyl-2-(2-hydroxyethylamino)-1,3-propanediol hydrochloride, m.p. 101.5°–102° C. The elemental analysis was as follows:

| Element | Calculated for $C_6H_{15}NO_3S \cdot HCl$ | Found |
|---|---|---|
| C | 33.6 | 33.4 |
| H | 7.41 | 7.5 |
| N | 6.43 | 6.6 |
| S | 14.7 | 13.9 (mercaptan) |

EXAMPLE V

Preparation of 2-Benzylthiomethyl-2-(3-phenylpropylamino)-1,3-propanediol Hydrochloride A solution of 66 g. (0.25 mol) of 2-amino-2-benzylthiomethyl-1,3-propanediol hydrochloride in 100 ml. of methanol was neutralized with 10 g. (0.25 mol) of sodium hydroxide, and the sodium chloride was removed by filtration. The filtrate was evaporated, and the free base was dissolved in 150 ml. of N-methylpyrrolidone. After the addition of 39 g. (0.55 mol) of 1-chloro-3-phenyl-propane, the solution was heated at 140° C. for 48 hours. The reaction mixture was poured into a liter of water; the oil which separated was acidified with 50 l. of concentrated hydrochloric acid. Subsequent addition of water gave a crystalline solid which was recrystallized from chloroform to give a 34 percent yield (32 g.) of the 2-benzylthiomethyl-2-(3-phenylpropyl-amino)-1,3-propanediol hydrochloride, m.p. 121–122° C. The elemental analysis was as follows:

| Element | Calculated for $C_{20}H_{27}NO_2S \cdot HCl$ | Found |
|---|---|---|
| C | 62.89 | 62.8 |
| H | 7.39 | 7.5 |
| N | 3.67 | 3.64 |
| S | 8.39 | 8.23 |

EXAMPLE VI

Preparation of 2-Mercaptomethyl-2(3-phenylpropylamino)-1,3-propanediol Hydrochloride A slurry of 32 g. (0.08 mol) of 2-benzylthiometyl-2-(3-phenylpropyl-amino-1,3-propanediol hydrochloride in 100 ml. of tetrahydrofuran was added to 1 liter of liquid ammonia at approximately −33° C. and atmospheric pressure. Sodium (8 g., 0.33 mol) was added to the resulting mixture to maintain a blue color for 1 hour. The mixture was neutralized with 18 g. (0.34 mol) of ammonium chloride, and the ammonia was off. A cold slurry of the residue in 200 ml. of n-propyl alcohol was saturated with hydrogen chloride. After warming, the inorganic salts were removed by filtration. The filtrate was stripped, and the residual oil was extracted three times with ether. Drying the residue in vacuo gave 2-mercaptomethyl-2-(3-phenylpropylamino)-1,3-propanediol hydrochloride as a clear glass. The elemental analysis was as follows:

| Element | Calculated for $C_{13}H_{21}NO_2S \cdot HCl$ | Found |
|---|---|---|
| C | 53.55 | 52.4 |
| H | 7.59 | 8.4 |
| N | 4.79 | 4.4 |
| S | 10.98 | 9.5 |

EXAMPLE VII

Preparation of 2-Benzylthiomethyl-2-(2-carbamoylethylamino)-1,3-propanediol Hydrochloride A solution of 132 g. (0.50 mol) of 2-amino-2-benzylthiomethyl-1,3-propanediol hydrochlordie in 500 ml. of tetrahydrofuran was neutralized with 20 g. (0.50 mol) of of sodium hydroxide, and the sodium chloride was removed by filtration. To the filtrate was added 53.8 g. (0.50 mol) of 3-chloro-propionamide, and the solution was heated at reflux temperature for 24 hours. The solvent was removed, and the reaction mixture was heated 48 hours on a steam bath. The product was dissolved in 300 ml. of tetrahydrofuran and 100 ml. of acetonitrile; cooling at −10° C. gave 79 g. of crude product, m.p. 119–121° C. Recrystallization from tetrahydrofuran gave a 27 percent yield (46 g.) of the 2-benzythiomethyl-2-(2-carbamoylethylamino)-1,3-propanediol hydrochloride, m.p. 145–147° C. The elemental analysis was as follows:

| Element | Calculated for $C_{14}H_{22}N_2O_3S \cdot HCl$ | Found |
|---|---|---|
| C | 50.21 | 49.8 |
| H | 6.92 | 7.3 |
| N | 8.37 | 8.7 |

EXAMPLE VIII

Preparation of 2-Mercaptomethyl-2-(2-carbamoylethylamino)-1,3-propanediol Hydrochloride A slurry of 46 g. (0.137 mol) of 2-benzylthiomethyl-2-(2-carbamoyl-ethylamino)-1,3-propanediol hydrochloride in 200 ml. of tetrahydrofuran was added to 1 liter of liquid ammonia at approximately −33° C. and atmospheric pressure; to the mixture was added 15.8 g. (0.6 mol) of sodium to maintain a blue color for 1 hour. The mixture was neutralized with 33 g. 33 g. (0.6 mol) of ammonium chloride, and the ammonia was boiled off. The product was suspended in 250 ml. of cold n-propyl alcohol, and the mixture was saturated with hydrogen chloride. After arming, the inorganic salts were removed by filtration. The filtrate was evaporated to yield a semisolid. The latter was extracted with 200 ml. of ether and then with 200 ml. of boiling tetrahydrofuran to remove benzyl. The water-white viscous oil resisted attempts at crystallization from various solvent combinations. Portion wise addition of ether to a solution in n-propyl alcohol gave three fractions (all viscous oils) 2.9 g. 5.3 g., and 11.7 g., which were vacuum-dried for 24 hours at 65° C. The intermediate fraction which was substantially pure 2-mercaptometyl-2-(2-carbamolethylamino)-1,3-propanediol hydrochloride was subjected to elemental analysis. The elemental analysis was as follows:

| Element | Calculated for $C_7H_{16}N_2O_3S \cdot HCl$ | Found |
|---|---|---|
| C | 34.34 | 35.75 |
| H | 7.00 | 7.25 |
| N | 11.45 | 9.2 |
| S | 13.10 | 10.9 (mercaptan) |

Gas chromatographic analysis of the sample showed the following impurities (in weight percent): tetrahydrofuran, 2.8; n-propyl alcohol, 0.2.

EXAMPLE IX

Preparation of (2-Chloroethyl)cyclohexane

To 100 g. (0.78 mol) of 2-cyclohexylethanol was added dropwise over a period of 30 minutes 95 g. (0.8 mol) of thionyl chloride. The solution was heated on a steam bath for 1 hour and then distilled through a 45-cm. Vigreux column to give an 85 percent yield (96.7 g.) of the (2-chloroethyl)cyclohexane, b.p. 115°–115.5° C. at 72 mm., $n_D^{20}$ 1.4652. The elemental analysis was as follows:

| Element | Calculated for $C_8H_{15}Cl$ | Found |
|---|---|---|
| C | 65.52 | 65.7 |
| H | 10.31 | 10.3 |

EXAMPLE X

Preparation of 2-Benzylthiomethyl-1-(1-cyclohexylethylemino)-1,3-propanediol Hydrochloride A solution of 174 g. (0.66 mol) of 2-amino-2-benzylthiomethyl-1,3-propanediol hydrochloride in 250 ml. of methanol was neutralized with 26.4 g. (0.66 mol) of sodium hydroxide, and the sodium chloride was removed by filtration. The solvent was stripped off. To the resulting free base was added 96 g. (0.66 mol) of (2-chloroethyl) cyclohexane in 250 ml. of tetrahydrofuran. The reaction mixture was heated at reflux temperature for 16 hours. The solvent was distilled, and the residue was heated at 140° C. for 16 hours. The crystalline product was recrystallized twice from 300 ml. of acetonitrile to give a 36-percent percent yield (90 g.) of the 2-benzylthiomethyl-1-(2-cyclohexylethylamino)-1,3-propanediol hydrochloride, m.p. 149°–151° C. The elemental analysis was as follows:

| Element | Calculated for $C_{19}H_{31}NO_2S \cdot HCl$ | Found |
|---|---|---|
| C | 61.02 | 59.7 |
| H | 8.63 | 8.5 |
| N | 3.75 | 4.0 |
| S | 8.57 | 8.9 |

EXAMPLE XII

Preparation of 2-Mercaptomethyl-2-(2-cyclohexylethylamino)-1,3-propanediol Hydrochloride A slurry of 90 g. (0.24 mol) of 2-benzylthiomethyl-2-(2-cyclohexyl-ethylamino)-1,3-propanediol hydrochloride in 250 ml. of tetrahydrofuran was added to 1 liter of liquid ammonia at approximately −X° C. and atmospheric pressure. The slurry was treated with 20 g. (0.87 mol) of sodium metal to maintain a blue color for 1 hour. The mixture was neutralized with 50 g. (0.93 mol) of ammonium chloride, and the ammonia was evaporated. A cold mixture of the residue in 250 ml. of n-propyl alcohol was saturated with hydrogen chloride. The mixture was warmed, and the inorganic salts were removed by filtration. The filtrate was evaporated, and the residue was extracted twice with ether. The residue was recrystallized once from a mixture of tetrahydrofuran and ether and once from a mixture of acetonitrile and tetrahydrofuran to give a 44-percent yield (30 g.) of the 2-mercaptomethyl-2-(2-cyclohexylethylamino(-1,3-propanediol hydrochloride, m.p. 123°–135° C. The elemental analysis was as follows:

| Element | Calculated for $C_{12}H_{25}NO_2S \cdot HCl$ | Found |
|---|---|---|
| C | 50.77 | 50.5 |
| H | 9.23 | 9.3 |
| N | 4.93 | 5.25 |
| S | 11.30 | 10.5 (mercaptan) |

EXAMPLE XII

Preparation of 2-Benzylthiomethyl-2-(3-hydroxypropylamino)-1,3-propanediol Hydrochloride A solution of 113.5 g. (0.5 mol) of 2-amino-2-benzylthiomethyl-1,3-propanediol, 47.3 g. (0.5 mol) of 3-chloropropanol and a crystal of potassium iodide was heated at 110° C. for 24 hours and then at 130° C. for 4 hours. Crystallization of the product from a mixture of 200 ml. of tetrahydrofuran and 50 ml. of methanol gave a thick gel which was dispersed in 2 liters of a mixture of acetonitrile and tetrahydrofuran to filter. The yield of 2-benzyl-thiomethyl-2-(3-hydroxypropylamino)-1,3 -propanediol hydrochloride was 51 percent (b 83 g.), m.p. 119°–122° C. The elemental analysis was as follows:

The elemental analysis was as follows:

| Element | Calculated for $C_{14}H_{23}NO_3S \cdot HCl$ | Found |
|---|---|---|
| C | 52.24 | 51.1 |
| H | 7.52 | 7.7 |
| N | 4.35 | 4.4 |
| S | 9.96 | 9.3 |

EXAMPLE XIII

Preparation of 2-Benzylthiomethyl-2-(2-benzylthioethylemino)-1,3-propanediol Hydrochloride A mixture of 62 g. (0.33 mol) of benzyl 2-chloroethyl sulfide, 75 g. (0.33 mol) of 2-amino-2-benzylthiomethyl-1,3-propanediol, 36 g. (0.33 mol) of sodium carbonate, and 300 ml. of xylene was stirred vigorously under reflux for 8 hours. After cooling, the mixture was diluted with an equal volume of ether and washed several times with water. The organic layer was evaporated under aspirator pressure. The residual oil was mixed with 500 ml. of isopropyl alcohol and 100 ml. of concentrated hydrochloric acid. After evaporation of the resulting solution, the residual oil was dissolved in acetonitrile. Cooling gave the 2-benzylthiomethyl-2-(2-benzylthioethylamino)-1,3-propanediol hydrochloride in a 65-percent yield (90 g.); recrystallization from acetonitrile gave small white crystals, m.p. 119° -121° C. The elemental analysis was as follows:

| Element | Calculated for $C_{20}H_{27}NO_2S_2 \cdot HCl$ | Found |
|---|---|---|
| C | 58.03 | 57.8 |
| H | 6.82 | 6.8 |
| N | 3.38 | 3.65 |

EXAMPLE XIV

Preparation of 2-Mercaptomethyl-2-(mercaptoethylamino)-1,3-propanediol Hydrochloride A solution of 2-benzylthiomethyl-2-(2-benzylthioethylamino)-1,3-propanediol hydrochloride (74 g., 0.18 mol) was prepared in 1 liter of liquid ammonia at approximately −33° C. and atmospheric pressure. Sodium (24 g., 1 mol) was added in small pieces to maintain a blue color for 2 hours. The solution was neutralized with 20 g., of ammonium chloride. All subsequent operations were carried out under nitrogen. After evaporation of the ammonia, 500 ml. of tetrahydrofuran and 250 ml. of 95-percent ethanol were added to the residue. The mixture was heated to 40° C.; after cooling to 10° C., the mixture was filtered. The solid was washed twice with isopropyl alcohol. The combined solutions were evaporated to dryness under aspirator pressure; the residual oil rapidly solidified. It was taken up in 400 ml. of hot isopropyl alcohol, and a slight turbidity was removed by filtration. The filtrate was saturated with hydrogen chloride. An inorganic solid separated and was removed. Evaporation and dissolution of the residue in isopropyl alcohol gave more inorganic material, as did cooling the solution to −70° C. Finally addition of ether to the alcohol solution gave, at −70° C., a crystalline solid that became an oil at room temperature. It was filtered on a funnel cooled with circulating acetone chilled at −60° C. Drying in a high vacuum overnight did not remove completely occluded or solvated isopropyl alcohol, found upon gas chromatographic analysis. The elemental analysis was as follows:

| Element | Calculated for $C_6H_{15}NO_2S_2 \cdot HCl \cdot 0.8C_3H_7OH$ | Found |
|---|---|---|
| C | 35.79 | 35.6 |
| H | 8.01 | 7.8 |
| N | 4.97 | 5.1 |
| S | 22.75 | 21.9 (mercaptan) |

It is to be understood that although in the preceding examples all the novel compounds were permitted to remain as the salts thereof, that it is within the skill of a chemist to free these novel compounds from the salt by merely treating them with a suitable base such as sodium or potassium hydroxide.

Obviously many modifications and variations of the present invention are possible in the light of the above teachings. It is therefore to be understood that within the scope of the appending claims the invention may be practiced otherwise than as specifically described herein.

What is claimed is:

1. A compound selected from the group consisting of compounds having the formula

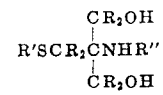

wherein each R is hydrogen or an alkyl radical containing 1–3 carbon atoms; R' is an alkyl radical containing 1–12 carbon atoms or hydrogen; R'' is a carbamoyl substituted alkyl radical containing 1–12 carbon atoms; and wherein the total number of carbon atoms in said compound is within the range of 6–36.

2. A compound selected from the group consisting of compounds having the formula

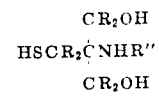

wherein R and R'' are as defined in claim 1 wherein the total number of carbon atoms in said compound is within the range of 6–36.

3. 2-Mercaptomethyl-2-(2-carbamoylethylamino)-1,3-propanediol, the product of the formula of claim 2.

4. 2-(3-Carbamoyl propylamine)-2-mercaptomethyl-1,3-propanediol, the product of the formula of claim 2.